United States Patent
Yamamura

(10) Patent No.: US 9,146,160 B2
(45) Date of Patent: Sep. 29, 2015

(54) SENSOR DEVICE AND ELECTRONIC APPARATUS

(71) Applicant: SEIKO EPSON CORPORATION, Tokyo (JP)

(72) Inventor: Mitsuhiro Yamamura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 111 days.

(21) Appl. No.: 13/848,334

(22) Filed: Mar. 21, 2013

(65) Prior Publication Data
US 2013/0292569 A1 Nov. 7, 2013

(30) Foreign Application Priority Data

Apr. 19, 2012 (JP) ................................. 2012-095352

(51) Int. Cl.
| G01J 5/00 | (2006.01) |
|---|---|
| G01J 5/34 | (2006.01) |
| G01J 1/44 | (2006.01) |
| H04N 5/33 | (2006.01) |
| H04N 5/378 | (2011.01) |
| H04N 5/225 | (2006.01) |
| G01J 5/08 | (2006.01) |
| G08B 13/191 | (2006.01) |

(52) U.S. Cl.
CPC .... G01J 5/34 (2013.01); G01J 1/44 (2013.01); G01J 5/0025 (2013.01); H04N 5/2256 (2013.01); H04N 5/33 (2013.01); H04N 5/378 (2013.01); *G01J 5/0806* (2013.01); *G01J 5/0896* (2013.01); *G01J 2005/345* (2013.01); *G08B 13/191* (2013.01)

(58) Field of Classification Search
USPC ....................................................... 250/338.3
See application file for complete search history.

(56) References Cited

U.S. PATENT DOCUMENTS

| 5,283,438 A | * | 2/1994 | Dautriche | 250/338.3 |
|---|---|---|---|---|
| 5,825,413 A | * | 10/1998 | Mullis | 348/155 |
| 7,847,252 B2 | | 12/2010 | Kawakubo et al. | |
| 8,648,304 B1 | * | 2/2014 | Tsuchiya | 250/338.3 |

FOREIGN PATENT DOCUMENTS

| DE | 294374 A5 | * | 5/1990 | ............. H01L 37/00 |
|---|---|---|---|---|
| JP | 2009-068863 A | | 4/2009 | |

OTHER PUBLICATIONS

Daisuke Akai et al.; "pyroelectric infrared sensors with fast response time and high sensitivity using epitaxial Pb(Zr,Ti) O3 Films on epitaxial γ-AI2O3/Si substrates"; Sensors and Actuators A: Physical, vols. 130-131; Aug. 14, 2006, pp. 111-115; Elsevier Science B.V.

* cited by examiner

*Primary Examiner* — David Porta
*Assistant Examiner* — Edwin Gunberg
(74) *Attorney, Agent, or Firm* — Gordon IP Counselors, LLP

(57) ABSTRACT

A sensor device includes a plurality of row lines WL, a plurality of column lines DL, a plurality of reset lines RL, a plurality of pixel circuits that connect to each one of the plurality of row lines, the plurality of column lines and the plurality of reset lines, and an amplifier circuit. The plurality of pixel circuits respectively includes a pyroelectric element, a reset switch that is driven by the plurality of reset lines and discharges an electric charge of the pyroelectric element, and a pixel selection switch that is driven by the plurality of row lines and outputs a signal, which is based on a change of the electric charge of the pyroelectric element by a discharge, to one of the column lines. The signal based on the change of the electric charge of the pyroelectric element by the discharge is amplified in the amplifier circuit.

14 Claims, 7 Drawing Sheets

SENSOR DEVICE AND ELECTRONIC APPARATUS

CROSS-REFERENCE TO RELATED APPLICATIONS

This application claims priority to Japanese Patent Application No. 2012-095352 filed on Apr. 19, 2012. The entire disclosure of Japanese Patent Application No. 2012-095352 is hereby incorporated herein by reference.

BACKGROUND

1. Technical Field

The present invention relates to a sensor device, an electronic apparatus, and the like having a pyroelectric element.

2. Background Technology

Infrared detection circuits in which pyroelectric elements or the like are employed are well-known. For example, infrared rays having wavelengths near 10 μm radiate from the human body, and detecting these rays allows information about the presence and temperature of a human body to be acquired without physical contact. Using such an infrared detection circuit therefore allows intrusion detection or measurements of physical quantities to be implemented.

The technologies disclosed in, for example, Non-Patent Document 1 and Patent Document 1 are well-known for infrared detection circuits. In the Non-Patent Document 1, a source follower circuit, which is configured from a transistor (JFET) and a resistor connected in series, is used to detect the pyroelectric current of a pyroelectric element.

In the Patent Document 1, a P-type transistor that functions as a load element and an N-type transistor that functions as an amplifier element are connected in series, whereby a common-source amplifier circuit is configured, and this common-source amplifier circuit is used to detect the pyroelectric current of a pyroelectric element.

Japanese Laid-open Patent Publication No. 2009-68863 (Patent Document 1) and Daisuke Akai et al., "Pyroelectric infrared sensors with fast response time and high sensitivity using epitaxial PbZr, TiO3 films on epitaxial γ-Al2O3/Si substrates." Sensors and Actuators A: Physical, Volumes 130-131, 14 Aug. 2006, Pages 111-115, Elsevier Science B. V. (Non-Patent Document 1) are examples of the related art.

SUMMARY

Problems to be Solved by the Invention

The pyroelectric element was irradiated by infrared rays and the change of the pyroelectric charge before and after the irradiation was read. In this time, the change of the pyroelectric charge before and after the irradiation was small so that it was necessary to amplify the difference. Thus, the detection circuit in each pixel has to be connected to an amplifier circuit during the change of the output by the irradiation.

Therefore, to read out the pyroelectric charge of all pixels by the infrared-ray irradiation in one time, it was necessary to provide the amplifier circuit in each pixel. Because of this, when the amplifier circuit was provided in each pixel, the pixel area became enormous so that it occurred that the total amount of the pixel current became enormous.

On the other hand, it was proposed that a plurality of pixels shares the amplifier circuit arranged in the outside of the pixels for the object of reducing the pixel area and the total amount of the pixel current. In this configuration, the infrared-rays were irradiated after the detection circuit in each pixel was connected to the amplifier circuit so that such operation was required every time the read out operation was performed in each pixel. Therefore, it was required to irradiate and block the infrared-rays in many times during one scanning so that it cannot be speeding up.

According to aspects of the invention, without providing an amplifier circuit in each pixel, a sensor device and an electronic apparatus that can perform a read out operation to read an output of the plural pixels with high sensitivity during the infrared-rays irradiation in one time can be provided.

Means Used to Solve the Above-Mentioned Problems (1) One aspect of the invention relates to a sensor device including:
a plurality of row lines;
a plurality of column lines;
a plurality of reset lines;
a plurality of pixel circuits that connect to each one of the plurality of row lines, the plurality of column lines, and the plurality of reset lines; and
an amplifier circuit that connects to one of the plurality of column lines;
wherein the plurality of pixel circuits are respectively driven by a pyroelectric element and one of the plurality of column lines, driven by a reset switch that performs a discharge of an electric charge of the pyroelectric element and one of the plurality of row lines, and include a pixel selection switch that outputs a signal to one of the plurality of column lines based on a change by the discharge of the electric charge of the pyroelectric element, and
wherein the signal is amplified in the amplifier circuit.

In one aspect of the invention, in each of the plurality of pixel circuits, while the reset switch is off in a period that a row line is selected to connect to the pixel circuit (during one horizontal scanning), this is a condition that the electric charge is charged to the pyroelectric element. On the other hand, when the reset switch is on, it causes a short circuit in both sides of the pyroelectric element during the one horizontal scanning and the stored electric charge is discharged when the light is irradiated so that even though it is during the light irradiation, the light irradiation does not reflect to the electric charge. Because of this, the reset switch is used as an electronic chopper by turning on the reset switch in a half way of the one horizontal scanning so that the voltage change which is the difference of the voltage based on the pyroelectric current after the light irradiation and the voltage based on the pyroelectric current before the light irradiation can be detected. Thus, the voltage change before and after the light irradiation output in chronological order from the column lines during the one horizontal scanning outputs from the pixel circuits in the column lines so that the voltage change after the light irradiation can be detected with high sensitivity. The signals output to the column lines are amplified in the amplifier circuit. One amplifier circuit is provided to one column line so that one amplifier circuit is shared in the plurality of pixel circuits in a column direction connected to one column line. Because of this, it is not required to provide the amplifier circuit to each pixel circuit so that the sensor device can be downsized.

(2) In one aspect of the invention, after storing the electric charge in the pyroelectric elements of the plurality of pixel circuits, the reset switches of the plurality of pixel circuits in which the electric charge is stored can be driven. The signal based on the change of the electric charge of the pyroelectric elements provided by the discharge is defined as a signal based on the change between the electric charge stored in the pyroelectric elements by the light irradiation and the electric charge after the discharge in the pyroelectric elements which was performed after the reset switches were turned on.

(3) In one aspect of the invention, the periods to drive the reset switch of the plurality of pixel circuits can be respectively varied by the plurality of reset lines. Therefore, in each of the plurality of pixel circuits, the reset switch can be on and off during a period that a row line is selected to connect to the pixel circuits (during one horizontal scanning).

(4) In one aspect of the invention, it can include an A/D converter that performs the A/D conversion to the signals amplified in the amplifier circuit. The A/D converter 140 can be provided in each of the plurality of column lines, or one A/D converter can be provided to be shared by the plurality of column lines, or by using the one A/D converter, the A/D conversion can be performed to the detected voltage of the plurality of column lines by the time-sharing.

(5) Another aspect of the invention defines an electronic apparatus that includes the sensor device described in (1) to (4).

(6) In another aspect of the invention, it includes a light source that irradiates light continuously, and the plurality of the reset switches can be driven after the light was irradiated from the light source and the electric charge was stored in the pyroelectric element.

In another aspect of the invention, the light is continuously irradiated from the light source to change the temperature of the pyroelectric element. Because of this, the light source can include a chopper to pass through or block the light, or the light source itself can irradiate the light continuously. The plurality of reset switches are driven after the light was irradiated from the light source and the electric charge was stored in the pyroelectric element so that it brings change to the electric charge that was charged in the pyroelectric element from the light source and the electric charge after discharged in the pyroelectric element by the reset switches.

(7) Still another of the invention relates to a sensor device including:
  a plurality of row lines;
  a plurality of column lines;
  a plurality of reset lines; and
  a plurality of pixel circuits that connect to each one of the plurality of row lines, the plurality of column lines, and the plurality of reset lines;
  wherein the plurality of pixel circuits include a pyroelectric element that generates a pyroelectric current and stores an electric charge based on the pyroelectric current, a reset switch that is driven by one of the plurality of reset lines and performs a discharge of the electric charge, and a pixel selection switch that is driven by one of the plurality of row lines and outputs a signal to the column lines based on the electric charge, and
  wherein the signal was generated by the discharge.

In another aspect of the invention, the amplifier circuit in the sensor device described in the above (1) of the aspects of the invention is omitted. As described above, the voltage change before and after the light irradiation output from the column lines in chronological order outputs to the column lines from the pixel circuits and the voltage change after the light irradiation can be detected in high sensitivity so that it is not necessarily that the amplifier circuit has to be provided in the sensor device.

(8) In still another aspect of the invention, a signal which outputs to the plurality of column lines from the plurality of pixel circuits can be a signal based on the electric charge which is simultaneously stored in the pyroelectric element of the plurality of pixel circuits. In other words, the light source is capable of irradiating the light simultaneously to the pyroelectric element in the plurality of pixel circuits.

In another aspect of the invention, at least, the light source is capable of continuous irradiation during one vertical scanning and it is not necessary for the continuous control of the light from the light source during the one vertical scanning so that it is possible for a faster drive.

(9) In still another aspect of the invention, it includes a plurality of amplifier circuits that connect to the plurality of column lines;
  wherein each of the plurality of amplifier circuits includes an amplifier that amplifies the voltage, which is inputted to an input terminal, from one of the plurality of column lines and outputs to an output terminal, and
  wherein the reset switch has a period that the pixel selection switch is selected by one of the plurality of row lines and can perform the discharge during the amplifier performs an amplifier operation.

Because of this, a signal based on the change of the electric charge of the pyroelectric element caused by the discharge can be amplified in the amplifier circuit

(10) In still another aspect of the invention, it defines an electronic apparatus that includes the sensor device as described in any of (7) to (9).

(11) In still another aspect of the invention, it includes a light source that irradiates light continuously, and the plurality of reset switches can be driven after the light was irradiated from the light source and the electric charge was stored in the pyroelectric element.

Therefore, as a signal generated by the discharge, it can output the signal based on the change of the electric charge that was charged in the pyroelectric element by the light irradiation and the electric charge after discharged in the pyroelectric element.

BRIEF DESCRIPTION OF THE DRAWINGS

Referring now to the attached drawings which form a part of this original disclosure.

DETAILED DESCRIPTION OF EXEMPLARY EMBODIMENTS

Preferred embodiments of the invention will be described in detail below. The present embodiment described below does not unduly limit the content of the invention described in the claims, and not all of the configurations described in the present embodiment are necessarily the means for solving problems using the invention.

1. Sensor Device

Figure 1A:
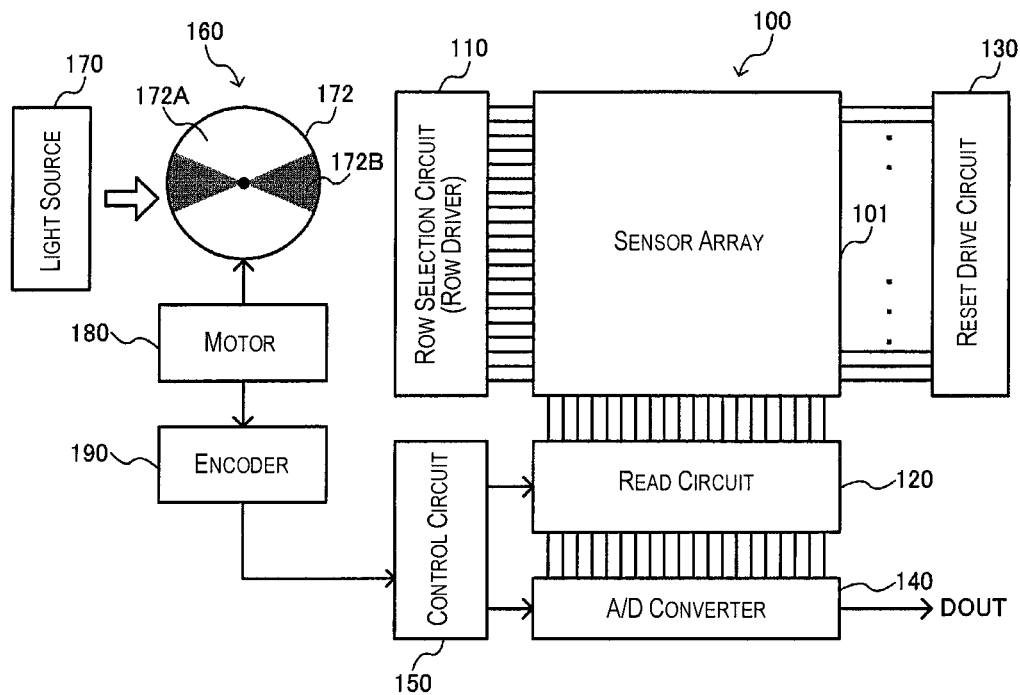
FIGS. 1A and 1B are a configuration diagram of a sensor device.
Figure 1B:
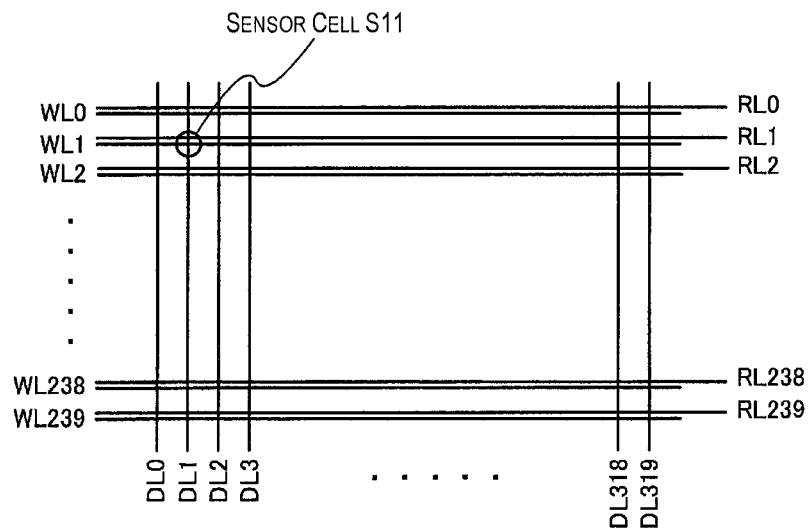

FIGS. 1A and 1B show a sensor device 100 according to one embodiment of the invention. The sensor device 100 includes a sensor array 101, a row-select circuit (row driver) 110, a read circuit 120, and reset drive circuit 130. Also, an A/D converter 140 and a control circuit 150 can be included. For example, an infrared camera, a terahertz camera, or the like can be realized by using this sensor device 100.

In the sensor array 101 (focal plane array), a plurality of row lines (word lines, scanning lines) WL, a plurality of column lines (data lines) DL, and a plurality of reset lines RL are provided.

The respective sensor cells of the sensor array 101 are arranged (formed) at locations corresponding to intersections between the respective row lines WL and the respective column lines DL. For example, the sensor cell S11 of FIG. 1B is arranged at a location corresponding to the intersection between the row line WL1 and the column line DL 1. Other sensor cells are arranged in the same manner.

The row-select circuit 110 connects to the plurality of row lines WL and performs a selection operation of the respective row lines WL. If the QVGA (320×240 pixels) sensor array 101 (focal plane array) such as the one shown in FIG. 1B is taken as an example, operations are performed for sequentially selecting (scanning) row lines WL0, WL1, WL2, . . . WL239. In other words, a signal for selecting the row lines WL (a word select signal) is outputted to the sensor array 101.

The read circuit 120 connects to a plurality of column lines DL and performs a read out operation of the respective column lines DL. If the QVGA sensor array 101 is taken as an example, operations are performed for reading detection signals (detection current, detection charge) from column lines DL0, DL1, DL2 . . . DL319. For example, the read circuit 120 is provided with the respective amplifier circuits corresponding to the respective column lines among the plurality of column lines. The respective amplifier circuits perform an amplification process of the signals of the corresponding column lines.

The reset drive circuit 130 connects to the plurality of reset lines RL and performs a selection operation of the respective reset lines RL. If the QVGA sensor array 101 is taken as an example, reset drive operations are performed for sequentially selecting reset lines RL0, RL1, RL2, . . . RL239. In other words, a signal (reset signal) for activating and selecting the reset lines RL is outputted to the sensor array 101.

The A/D converter part 140 performs A/D conversion to convert the detection voltage (measurement voltage, ultimate voltage) acquired in the read circuit 120 to digital data. Digital data DOUT that has been subjected to A/D conversion is outputted. Specifically, the A/D converter part 140 is provided with the respective A/D converters corresponding to the plurality of column lines DL. The A/D converters perform A/D conversion on the detection voltages acquired by the read circuit 120 for the corresponding column lines DL. One A/D converter is provided to correspond to a plurality of column lines DL, and this single A/D converter can be used to perform A/D conversion on the detection voltages of the plurality of column lines DL in a time-divided fashion. The configuration can also be such that the amplifier circuits of the read circuit 120 are not provided, and the signals of the respective column lines are inputted directly to the respective A/D converters of the A/D converter part 140.

The control circuit 150 (timing-generating circuit) generates a variety of control signals and outputs the signals that control a timing of the row-select circuit 110, the read circuit 120, the reset circuit 130, and the A/D converter part 140.

The control circuit 150 of the sensor device 100 can input a timing signal from the electronic apparatus side in which the sensor device is equipped. For example, as shown in FIG. 1, the electronic apparatus can have a light source 160 that is possible for the continuous control of infrared frequency light (infrared rays) and terahertz frequency light (it is also called as electromagnetic ray). The light source 160 can includes, for example, a light source 170 that is capable of continuous emission, a chopper 172, a motor 180 that operates a rotary drive of the chopper 172, and an encoder 190 that encodes rotational amount of the motor 180.

The chopper 172 is a disk formed by a transmissive part 172A that transmits continuous light to the sensor array 101 from the light source 170 and a block part 172B that blocks continuous light, and by driving the motor 180, the transmissive part 172A and a block part 172B are alternatively faced to the sensor array 101. The period that the transmissive part 172A of the chopper 172 is faced to the sensor array 101 can be more than the period of one horizontal scanning (1H). For example, it can be more than the period of one vertical scanning (1V). By inputting an output from the encoder 190 as a reference timing signal, the control circuit 150 of the sensor device 100 can generate a timing signal of the one horizontal scanning period (1H), the one vertical scanning period (1V), or other timing signals.

2. Pixel Circuit

Figure 2:
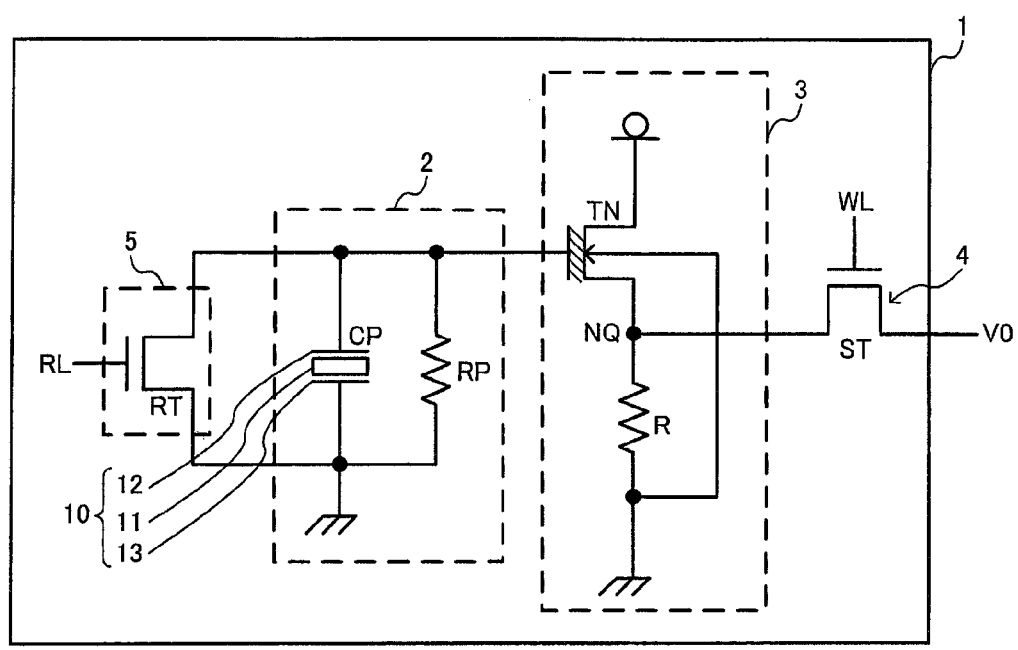
FIG. 2 is a circuit diagram of a pixel circuit of the sensor device according to one aspect of the invention.

FIG. 2 shows a pixel circuit that is provided in the sensor array 101 of the sensor device 100 according to one embodiment of the invention. The pixel circuit 1 shown in FIG. 2 includes a pyroelectric element 2, a source follower circuit 3, a pixel selection switch 4, and a reset switch 5.

The pyroelectric element 2 is equivalently indicated by a capacitor CP and a resistor RP of a pyroelectric capacitor 10. For example, the light such as the infrared rays, the terahertz light, or the like is irradiated to the pyroelectric element 2, and the intrinsic polarization in response to the temperature of the pyroelectric element 2 is generated in the pyroelectric body (ferroelectric) 11 of the pyroelectric capacitor 10. And, electrical neutrality relative to the surface charge of electrodes 12, 13 is maintained.

The source follower circuit 3 includes, for example, an N-type depletion-mode transistor TN and a pull-down resistor R.

The N-type depletion-mode transistor TN and the resistor R are provided in series between a VCC node (broadly speaking, the power node on the high-potential side) and a GND node (broadly speaking, the power node on the low-potential side) to configure a source follower circuit 3.

A detection signal SD (detection voltage) is inputted from the pyroelectric element 2 to the gate of the N-type transistor TN. The source of the N-type transistor TN is connected to one end of the resistor R. The source follower circuit is configured from the transistor TN and the resistor R, and the gain thereof is approximately 1. An output voltage VQ that changes along with changes in the voltage of the detection signal SD is outputted from an output node NQ, which corresponds to the source of the N-type transistor TN, via the pixel selection switch 4.

The pixel selection switch 4 can be configured by a pixel selection transistor ST. One of the plurality of row lines WL0, WL1, WL2, . . . as shown in FIG. 1B is connected to the gate of the pixel selection transistor ST. An electric potential in one of the plurality of row lines becomes active during one horizontal scanning (1H), and during this period, the pixel selection transistor ST supplies the voltage, which is from the source follower circuit 3, to one of the plurality of column lines DL0, DL1, DL2, . . . as shown in FIG. 1B.

The reset switch 5 that is controlled by the reset drive circuit 130 and discharges the electric charge by which both ends of electrodes 12, 13 of the pyroelectric capacitor 10 of the pyroelectric element 2 short-circuit can be configured by the reset transistor RT.

3. Operation of the Sensor Device

Figure 3:
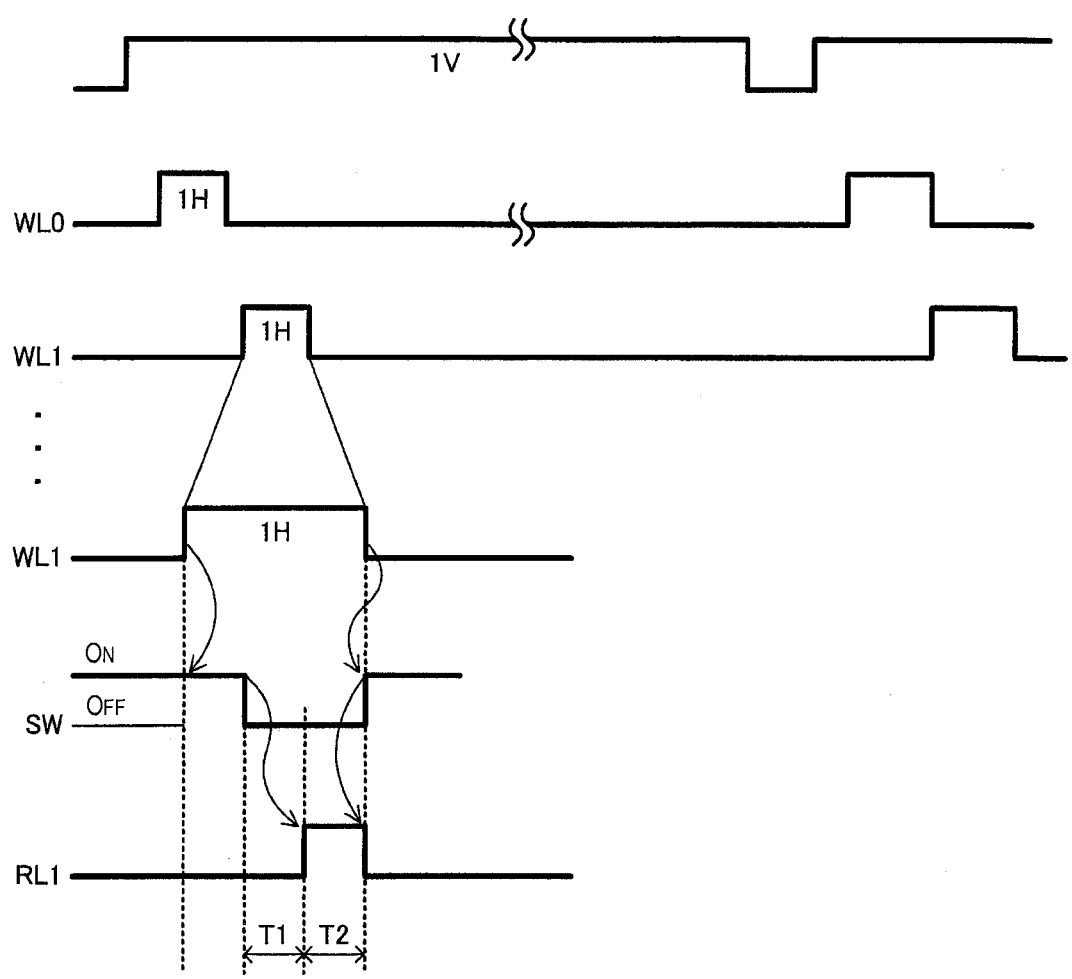
FIG. 3 is a timing chart showing an operation of the sensor device shown in FIG. 1.

FIG. 3 is a timing chart showing an operation of the sensor device 100. By the way, the details about the on/off operations of the switch SW as shown in FIG. 3 will be discussed later. A period that the transmissive part 172A of the chopper 172 faces to the sensor array 101 is defined as the one vertical scanning period (1V) shown in FIG. 3. The light is irradiated to the sensor array shown in FIG. 1A during the one vertical scanning period (1V) shown in FIG. 3.

The control circuit 150 shown in FIG. 1A generates a one vertical scanning signal indicating the one vertical scanning period (1V) based on a reference timing signal from the encoder 190 and additionally generates a one horizontal scanning signal indicating the one horizontal scanning period (1H) based on the number of column lines DL.

The row-select circuit 110 shown in FIG. 1A supplies a scanning signal of an electric potential, which becomes active every one horizontal scanning period (1H) shown in FIG. 3, to the plurality of row lines WL0, WL1, . . . . For example, when the electric potential of the row line WL1 becomes active, in 320 pixel circuits 1 that are connected to the row line WL1 shown in FIG. 1B, the pixel selection switches 4 shown in FIG. 2 are simultaneously turned on during the one horizontal scanning period (1H).

Because of this, in each of the 320 pixel circuits 1, the output voltage VO in accordance with the voltage of the detection signal SD from the pyroelectric element 2 of FIG. 2 outputs to the plurality of column lines DL0 to DL239 through the source follower circuit 3 and the pixel selection switch 4.

In the present embodiment, as shown in FIG. 3 by one (RL1) of the plurality of reset lines RL0 to RL 239, the reset drive circuit 130 turns on the reset switches 5 in one row of the 320 pixel circuits 1 connected to, e.g., the row line WL1, which is an active electric potential, in a middle of the one horizontal scanning period (1H).

The one horizontal scanning period (1H) is included in the one vertical scanning period (1V) so that the light is incident on the sensor array 101 of FIG. 1A. In addition, the pixel selection switch 4 of the corresponding pixel circuit 1 is turned on during the one horizontal scanning period (1H) so that the output voltage VO is outputted to the corresponding column line DL.

In this point, when the reset switches 5 of FIG. 2 are turned on at the timing of FIG. 3, both electrodes 12, 13 of capacitors 10 of the pyroelectric element 2 are short-circuit during the one horizontal scanning period (1H). While the reset switches 5 are turned off in the one horizontal scanning period (1H), this is the condition that the electric charge is charged in the pyroelectric element 2 by the light irradiation. On the other hand, when the reset switches 5 are turned on, the both electrodes 12, 13 of the capacitors 10 of the pyroelectric element 2 are short-circuit in a middle of the horizontal scanning period (1H) and the stored electric charge is discharged in a time of the light irradiation. The voltage SD of the pyroelectric element 2 in this time is defined as the voltage based on the pyroelectric current at the time of the non-light irradiation although it is during the light irradiation. Specifically, the change of the output voltage VO can be defined as the voltage change reflected by the pyroelectric currents before and after the light irradiation.

Because of this, in the present embodiment, by turning on the reset switches 5 in a middle of the one horizontal scanning period (1H), the reset switch can be used as an electronic chopper. Specifically, although the light is continuously irradiated by the mechanical chopper 172, it can be set as both conditions such as a charged condition after the light irradiation and a discharged condition before the light irradiation by turning on and off the reset switch 5. Thus, the voltage change before and after the light irradiation outputted from the column lines DL in a chronological order during the one horizontal period (1H) can be detected with the high sensitivity. Because of this, it can not be necessary to provide an amplifier circuit in each pixel circuit so that the sensor array 101 can be downsized.

Also, the scanning signals are supplied to sequentially activate the row lines WL0, WL1, . . . while the light is continuously irradiated in the one vertical scanning period (1V) by the mechanical chopper 172 so that the output from the plurality of pixel circuits 1 can be read by one light irradiation. Therefore, it is possible to read out in the high speed.

4. Amplifier Circuit that is Connected to a Column Line

Figure 4:
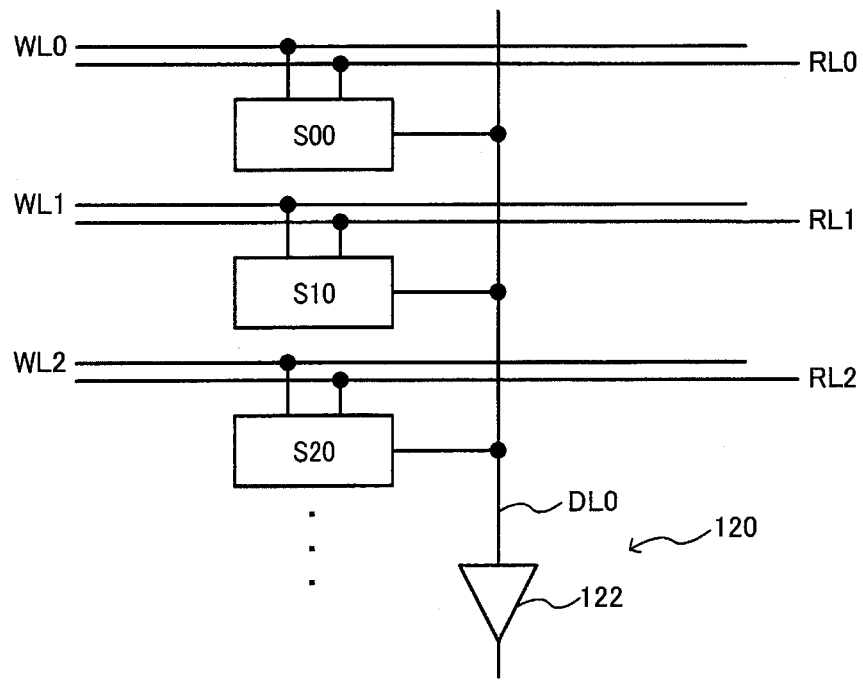
FIG. 4 is a block diagram showing a plurality of pixel circuits that are connected to one column line equipped with an amplifier circuit.

In the present embodiment, it is not necessary that the amplifier circuit has to be provided in each pixel circuit, but the read circuit 120 shown in FIG. 1A can have a plurality of amplifier circuits connected to the plurality of column lines DL0 to DL319, and FIG. 4 shows an amplifier circuit 122 connected to the column line DL0.

Figure 5:
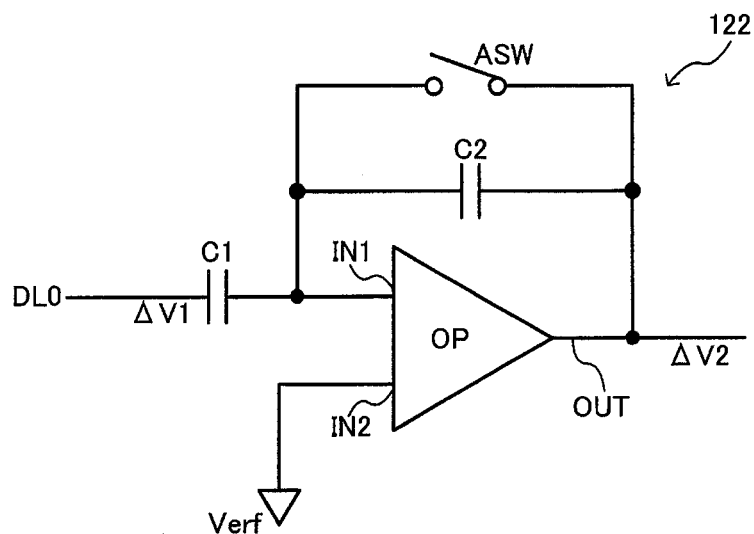
FIG. 5 shows an example of the amplifier circuit.

As shown in FIG. 5, the amplifier circuit 122 shown in FIG. 4 includes an amplifier OP that amplifies in a differential amplifier between voltage from the column line DL0 inputted to the first input terminal IN1 and reference voltage Vref inputted to the second input terminal IN2 and outputs to an output terminal, and an amplifier switch SW that makes a short-circuit for the first input terminal IN1 and the output terminal OUT.

In one aspect of the invention, one amplifier circuit 122 is provided in one of the column lines DL so that the plurality of pixel circuits 1 in a column direction connected to one of the column lines DL (the sensor cells S00, S10, S20, . . . in the pixel circuit 1 as shown in FIG. 4) shares one amplifier circuit 122. When the amplifier switch SW is turned on, the amplifier OP becomes a non-operating state by making short-circuit in the first input terminal IN1 and the output terminal OUT. The amplifier OP becomes the non-operating state every one horizontal scanning period (1H) so that it can be prevented from a crosstalk that is affected between the voltages from the plurality of pixel circuits 1 to one of the column lines DL.

As shown in FIG. 3, the amplifier switch SW turns off before the reset switch 5 turns on during the one horizontal scanning period (1H). By turning off the amplifier switch SW, the amplifier OP becomes in an operating state so that it prepares for the amplification. In the first period T of FIG. 3, the pyroelectric current after the light was irradiated and the electric charge was charged in the pyroelectric element 2 flows and after that, in the one horizontal scanning period (the second period T2), the pyroelectric current after the light was irradiated and the electric charge of the pyroelectric element 2 was discharged flows so that the voltage change reflected to the pyroelectric current (electric charge) which is the output of the pixel circuits 1 before and after the light irradiation can be amplified in the amplifier circuit 122.

As shown in FIG. 5, the amplifier OP further includes the first capacitor C1 connected to the column line DL0 and the second capacitor C2 connected to the first input terminal IN1 and the output terminal OUT. In this point, when the voltage change from the column line DL0 is $\Delta V1$, the voltage change of the output terminal OUT of the amplifier OP is $\Delta V2$, the capacitance value of the first capacitor C1 is C1, and the capacitance value of the second capacitor C2 is C2, $\Delta V2 = \Delta V1 \times C1/C2$ is realized.

Because of this, to the voltage change $\Delta V2$ of the output terminal OUT of the amplifier OP, the voltage change $\Delta V1$ of the first input terminal IN1 is only amplified in a gain C1/C2 so that the change of the pyroelectric current can be amplified as a voltage change.

5. Electronic Apparatus

Figure 6:
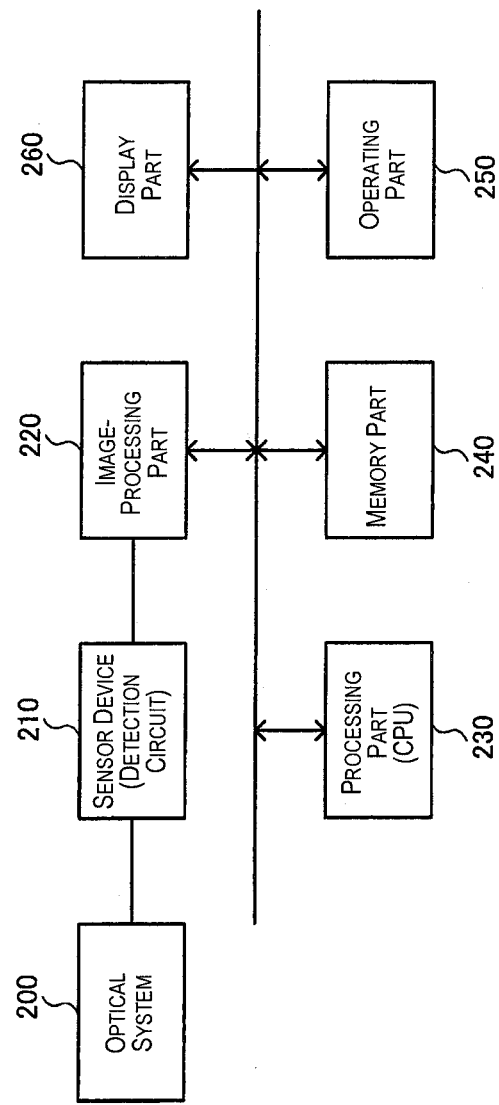
FIG. 6 is a block diagram of an electronic apparatus according to the present embodiment.

FIG. 6 shows a configuration example of an electronic apparatus that includes the sensor device of the present embodiment. Besides the light source 160 shown in FIG. 1A, the electronic apparatus includes an optical system 200, a sensor device 210 (detection circuit), an image processing part 220, a processing part 230, a memory part 240, a control part 250, and a display part 260. By the way, the configuration is not limited to the electronic apparatus of the present embodiment shown in FIG. 6 so that a part of the components (e.g., the optical system, the control part, the display part, or the like) can be omitted or it can be possible to add other components.

The optical system 200 includes, e.g., one or a plurality of lenses, a drive part that drives these lenses, or the like, and it performs an image formation of an object image to the sensor device 210. Also, if necessary, it performs a focus adjustment, and the like.

The sensor device 210 was explained in FIG. 2 and the like, and performs an image processing of an object image. The image processing part 220 performs variety of image processing such as an image correction process based on a digital image data (image data) from the sensor device 210.

The processing part 230 controls entire electronic apparatus, and controls the respective blocks in the electronic apparatus. For example, the processing part 230 is realized as a CPU, or the like. The memory part 240 stores variety of information and for example, it functions as in a work area of the processing part 230 or the image processing part 220. The control part 250 is an interface for a user to control the electronic apparatus, and for example, it is realized by the variety of buttons, the GUI (Graphical User Interface) display, or the like. The display part 260 displays, e.g., an image acquired from the image sensor 210, the GUI display, or the like, and it is realized by the various types of displays such as a liquid crystal display, an organic EL display, or the like, or a projection type display device.

By the way, an infrared camera using FPA (Focal Plane Array: Focal plane array) or the electronic apparatus using an infrared camera can be applied in the present embodiment. Examples of electronic apparatuses in which an infrared camera is applied could include navigation apparatuses for forming images of objects in the dark, thermographic apparatuses for acquiring temperature distributions of an object, intrusion-detecting devices for detecting human intrusion, analytic apparatuses (measuring apparatuses) for analyzing (measuring) the physical information of an object, security apparatuses for detecting fire and heat generation, and FA (factory automation) apparatuses provided to factories and the like. If the navigation apparatus is applied to a vehicle-mounted apparatus, images of people and the like can be detected and displayed when the vehicle is traveling in the dark. If the apparatus is applied to a thermographic apparatus, the apparatus can be used for influenza quarantine and the like.

Figure 7:
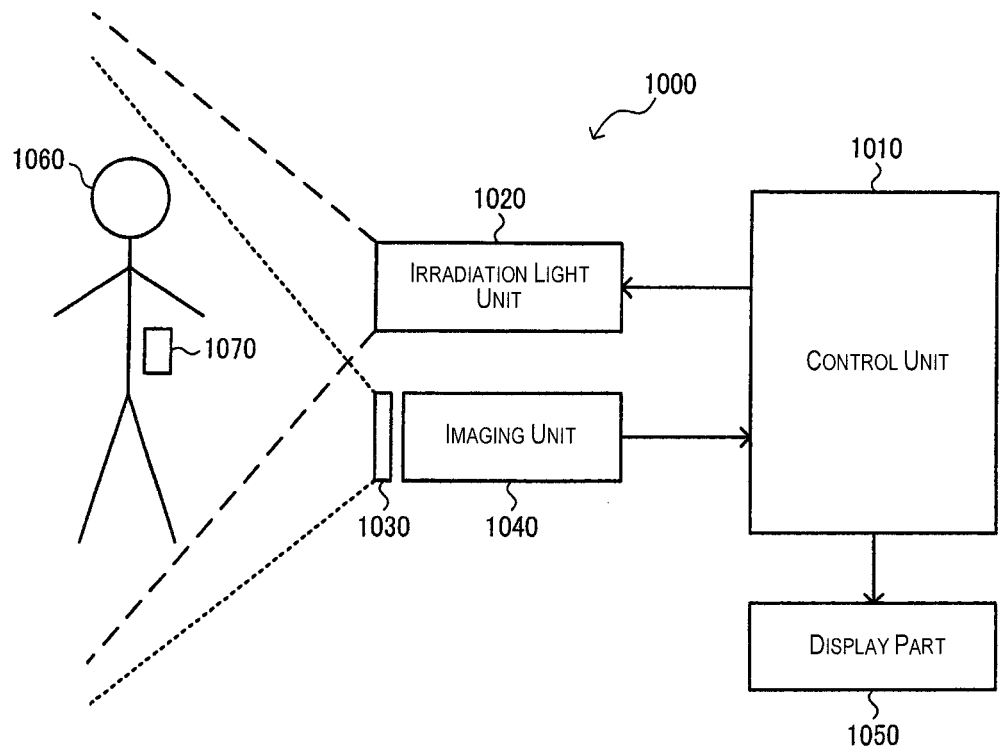
FIG. 7 shows a body temperature measuring device (electronic apparatus) that includes a terahertz camera.

As an example of the electronic apparatus that includes a pyroelectric type light detector or a pyroelectric type light detection device of the present embodiment, FIG. 7 shows an example that configures a specific material detection device 1000 combined with a terahertz light irradiation unit by using the sensor device as a terahertz light sensor device in which the absorption wavelength of the light absorption material of the pyroelectric type light detector in the above described sensor device 110 is in a terahertz area.

The specific material detection device 1000 is configured by a control unit 1010, a light irradiation unit 1020, an optical filter 1030, an imaging unit 1040 and a display part 1050. The imaging unit 1040 includes the sensor device in which the absorption wavelength of the light absorption material of the above described pyroelectric type light detector such as a lens that is not shown in the drawing is in the terahertz area.

The control unit 1010 includes a system controller to control the entire present device, and the system controller is included in the control unit to control the light source drive part and the image processing unit. The light irradiation unit 1020 includes a laser device and an optical system to irradiate the terahertz light (it indicates an electromagnetic wave that the wavelength is in a range of 100 μm to 1000 μm), and the terahertz light is irradiated to a human body as a detection object. By the way, the light irradiation unit 1020 can continues the light irradiation in the same manner as the light source 160 of FIG. 1A, but it is not necessary have to use the chopper 172 so that the laser oscillation itself can be turned on and off. The terahertz reflection light from the human body 1060 is received to the imaging unit 1040 through the optical filter 1030 that only gets through a spectroscopic spectrum of the specific material 1070 which is the detection object. A predetermined image process is processed to the image signal, which was generated in the imaging unit 1040, in the image processing unit of the control unit 1010, and the image signal is outputted to the display part 1050. By different strengths of the light-receiving signals, it can be judged whether or not the specific material 1070 is existed in clothing or the like of the human body 1060.

Figure 8:
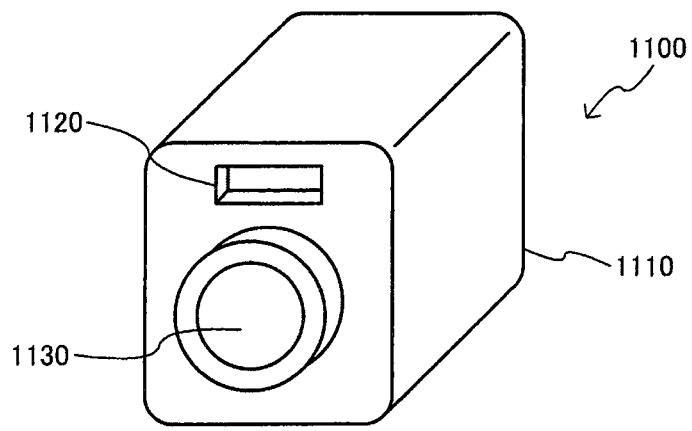
FIG. 8 is a perspective illustration of the terahertz camera.

FIG. 8 shows the terahertz camera 1100 that takes an image by receiving light that the frequency is terahertz. The terahertz camera 1100 includes a chassis 1110 having a slit 1120 and a lens 113.

Figure 9:
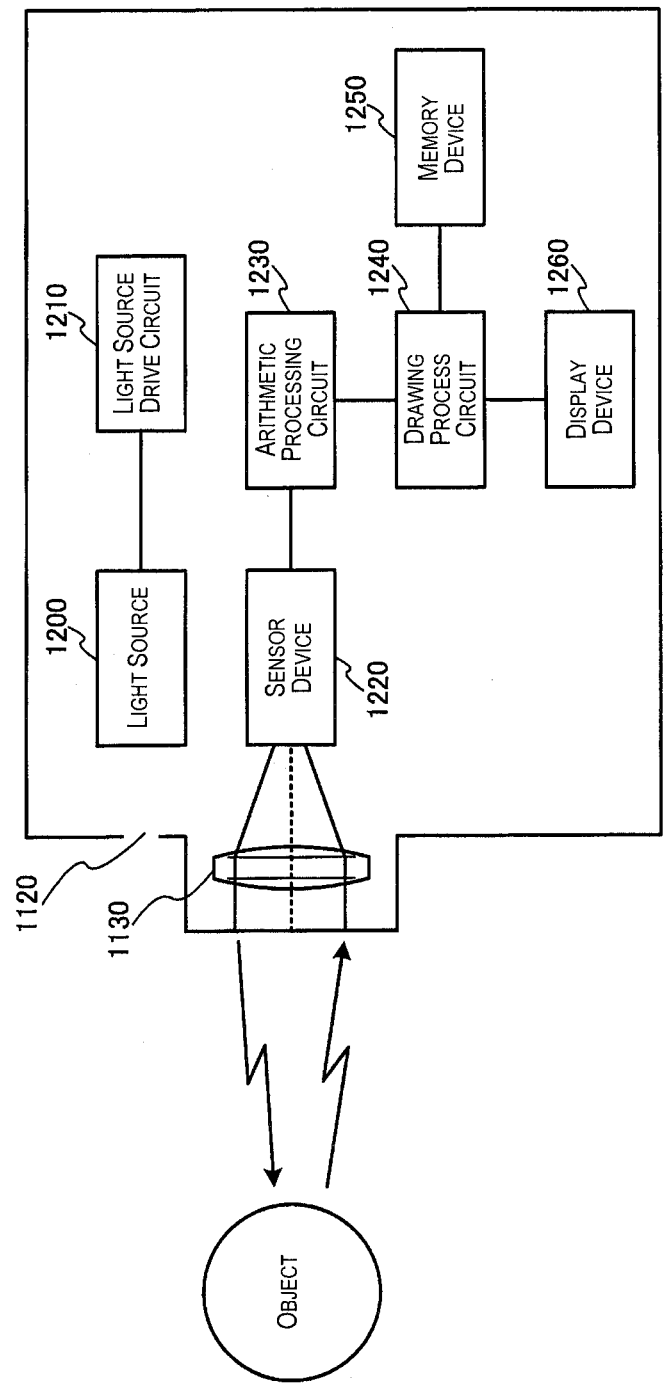
FIG. 9 is a block diagram of the terahertz camera.

As shown in FIG. 9, a terahertz light source 1200 and a light source drive circuit 1210 are provided in the chassis 1110, and the terahertz light is irradiated to an object through the slit 1120.

The reflection light from the object is concentrated in the lens 1130, and it is detected in the sensor device according to the above described embodiment. A digital signal from a sensor device 1220 is processed by an arithmetic processing in an arithmetic processing device 1230, it is processed by a drawing processing in a drawing process circuit 1240, it is stored in a memory device 1250, and it is displayed in a display device 1260 or else.

The usage of the terahertz camera can be varied, and other than the above described field, for example, in a field of a drug testing, a mixture of a polymorphism of a final drug at the time of the drug-manufacturing, a deviation of medicinal properties, and an existence or non-existence of cavities or foreign materials are detected. At the time of dosage, types or quantity of a medicine is checked or a foreign material is detected. At the time of dispensing of drugs, it is checked whether a type or a component of a drug that should be dispensed is correct. Other than that, when the terahertz camera is built-in various production lines, it is possible to check a total number of products.

The present embodiment was described in detail above, but the fact that many modifications are possible that do not substantially depart from the new matter and effects of the invention can be easily understood by a person of ordinary skill in the art. Such modified examples are therefore all included in the scope of the invention. For example, terms (VCC node, GND node, and the like) that are mentioned at least once together with different terms that are broader or identical in meaning (high-potential-side power node, low-potential-side power node) in the specification and drawings can be substituted with those different terms at any location in the specification and drawings. The configurations and operation of the detection circuit, the sensor device, and the electronic apparatus are also not limited to the descriptions of the present embodiment, and a variety of modifications are possible.

The entire disclosure of Japanese Patent Application No. 2012-095352, filed Apr. 19, 2012. is expressly incorporated reference herein.

What is claimed is:

1. A sensor device comprising:
a plurality of row lines;
a plurality of column lines;
a plurality of reset lines;
a plurality of pixel circuits that connect to each one of the plurality of row lines, the plurality of column lines and the plurality of reset lines,
each of the plurality of pixel circuits including
a pyroelectric element,
a reset switch that connects to one of the plurality of reset lines and discharges an electric charge of the pyroelectric element, the reset switch being arranged in parallel with the pyroelectric element, the reset switch charging the electric charge of the pyroelectric element in an off-state and discharging the electric charge of the pyroelectric element in an on-state, and
a pixel selection switch that is driven by one of the plurality of row lines and outputs a signal, which is based on a change of the electric charge of the pyroelectric element by a discharge, to one of the plurality of column lines;
an amplifier circuit that connects to one of the plurality of column lines, the signal being amplified in the amplifier circuit; and
a reset circuit that controls the reset switch,
the reset circuit controlling the reset switch, which is included in one of the plurality of the pixel circuits, to change from the off-state to the on-state after a period starts and before the period ends, during the period one of the plurality of the row lines being selected and connected to the pixel selection switch which is included in the one of the plurality of the pixel circuits which is connected to the one of the plurality of the row lines being selected.

2. The sensor device according to claim 1, wherein the reset switches of the plurality of pixel circuits that store the electric charge are controlled by the reset circuit to change from the off state to the on-state after the electric charge has been stored in the pyroelectric elements of the plurality of pixel circuits.

3. The sensor device according to claim 2, wherein a period of controlling the reset switches of the plurality of pixel circuits to be in the on-state is respectively varied depending on the plurality of reset lines.

4. The sensor device according to claim 1, further comprising: an A/D converter that performs an A/D conversion of the signal amplified in the amplifier circuit.

5. An electronic apparatus comprising the sensor device according to claim 1.

6. The electronic apparatus according to claim 5, further comprising: a light source that intermittently irradiates light, wherein the plurality of reset switches are controlled by the reset circuit to change from the off-state to the on-state after the electric charge has been stored in the pyroelectric elements by irradiating the light from the light source.

7. A sensor device comprising:
a plurality of row lines;
a plurality of column lines;
a plurality of reset lines;
a plurality of pixel circuits that connect to each one of the plurality of row lines, the plurality of column lines and the plurality of reset lines,
each of the plurality of pixel circuits including
a pyroelectric element that generates pyroelectric current and stores electric charge based on the generated pyroelectric current,
a reset switch that connects to one of the plurality of reset lines and discharges the electric charge, the reset switch being arranged in parallel with the pyroelectric element, the reset switch charging the electric charge of the pyroelectric element in an off-state and discharging the electric charge of the pyroelectric element in an on-state, and
a pixel selection switch that is driven by one of the plurality of row lines and outputs a signal, which is based on the electric charge, to the column lines, the signal being generated by the discharge; and
a reset circuit that controls the reset switch,
the reset circuit controlling the reset switch, which is included in one of the plurality of the pixel circuits, to change from the off-state to the on-state after a period starts and before the period ends, during the period one of the plurality of the row lines being selected and connected to the pixel selection switch which is included in the one of the plurality of the pixel circuits which is connected to the one of the plurality of the row lines being selected.

8. The sensor device according to claim 7, wherein the signal which outputs to the plurality of column lines from the plurality of pixel circuits is a signal based on the electric charge which is simultaneously stored in the pyroelectric elements of the plurality of pixel circuits.

9. The sensor device according to claim 7, further comprising: a plurality of amplifier circuits that connect to the plurality of column lines;
wherein each of the plurality of amplifier circuits includes an amplifier that amplifies the voltage, which is inputted to an input terminal, from one of the plurality of column lines and outputs to an output terminal, and
wherein the reset switch has a period that the pixel selection switch is selected by one of the plurality of row lines so as to perform the discharge while the amplifier performs an amplifier operation.

10. An electronic apparatus comprising the sensor device according to claim 7.

11. The electronic apparatus according to claim 10, further comprising: a light source that intermittently irradiates light, wherein the plurality of reset switches are controlled by the reset circuit to change from the off-state to the on-state after the electric charge has been stored in the pyroelectric element by irradiating the light from the light source.

12. The sensor device according to claim 1, wherein
the reset circuit controls the reset switch, which is included in the one of the plurality of the pixel circuits, to change from the on-state to the off-state in response to end of the period.

13. The sensor device according to claim 12, wherein
the amplifier circuit, which is connected to the one of the plurality of the pixel circuits, changes from a non-operating state to an operating state after the period has started and before the period ends.

14. The sensor device according to claim 13, wherein
the reset circuit controls the reset switch to change from the off-state to the on-state after the amplifier circuit has changed from the non-operating state to the operating state during the period.

* * * * *